US008856682B2

(12) United States Patent
Moore et al.

(10) Patent No.: US 8,856,682 B2
(45) Date of Patent: Oct. 7, 2014

(54) DISPLAYING A USER INTERFACE IN A DEDICATED DISPLAY AREA

(75) Inventors: Scott David Moore, Manchester Center, VT (US); Yi Fang, Manchester Center, VT (US); Jost Eckhardt, Pawlet, VT (US); Richard Wayne Demar, Hinesburg, VT (US)

(73) Assignee: AI Squared, Manchester Center, VT (US)

( * ) Notice: Subject to any disclaimer, the term of this patent is extended or adjusted under 35 U.S.C. 154(b) by 552 days.

(21) Appl. No.: 12/777,739

(22) Filed: May 11, 2010

(65) Prior Publication Data

US 2011/0283227 A1 Nov. 17, 2011

(51) Int. Cl.
*G06F 3/048* (2013.01)
*G06F 3/0481* (2013.01)

(52) U.S. Cl.
CPC .... *G06F 3/0481* (2013.01); *G06F 2203/04805* (2013.01); *G06F 2203/04806* (2013.01); *G06F 2203/04803* (2013.01)
USPC .......................................... 715/800; 715/815

(58) Field of Classification Search
CPC .................... G06F 3/0481; G06F 2203/04806
USPC ......................................................... 715/800
See application file for complete search history.

(56) References Cited

U.S. PATENT DOCUMENTS 5,640,498 A * 6/1997 Chew ............................ 715/790
5,644,737 A * 7/1997 Tuniman et al. .............. 715/810
5,745,109 A * 4/1998 Nakano et al. ................ 715/838
5,920,316 A * 7/1999 Oran et al. .................... 715/779
6,330,010 B1 * 12/2001 Nason et al. ................. 715/802
6,373,526 B1 4/2002 Kessler et al.
6,591,008 B1 * 7/2003 Surve et al. ................... 382/162
6,624,831 B1 * 9/2003 Shahine et al. ............... 715/815
7,916,157 B1 * 3/2011 Kelley et al. .................. 345/660
2001/0009445 A1 7/2001 Chung
2002/0003469 A1 1/2002 Gupta
2002/0196370 A1 * 12/2002 Dagtas et al. ................. 348/600
2003/0122962 A1 7/2003 Kim
2003/0137522 A1 * 7/2003 Kaasila et al. ................ 345/619
2003/0145337 A1 7/2003 Xing
2003/0214519 A1 * 11/2003 Smith et al. ................... 345/660
2004/0111272 A1 6/2004 Gao et al.
2005/0069843 A1 3/2005 Bagues (Continued)

FOREIGN PATENT DOCUMENTS

EP 2048651 A1 4/2009
WO WO 2008/042126 A2 4/2008

OTHER PUBLICATIONS

International Search Report and Written Opinion for PCT/US2011/034975, mailed Aug. 4, 2011.

(Continued)

*Primary Examiner* — Doon Chow
*Assistant Examiner* — Conrad Pack
(74) *Attorney, Agent, or Firm* — Wolf, Greenfield & Sacks, P.C.

(57) ABSTRACT

Some embodiments are directed to techniques for displaying a user interface of an application program on a display device. The display device may be partitioned into two portions, such that the user interface and a computer desktop are displayed in separate portions of the display. As a result, the user interface does not overlap or obscure any portion of the displayed desktop.

36 Claims, 11 Drawing Sheets

(56) References Cited

U.S. PATENT DOCUMENTS

2005/0105890 A1 5/2005 Chung et al.
2005/0184993 A1 8/2005 Ludwin et al.
2007/0033542 A1 2/2007 Winser et al.
2007/0033543 A1* 2/2007 Ngari et al. .................. 715/788
2007/0033544 A1* 2/2007 Fleisher et al. ............... 715/800
2007/0130515 A1* 6/2007 Maas ........................... 715/526
2007/0136692 A1 6/2007 Seymour et al.
2007/0198932 A1 8/2007 Uchimura
2008/0059152 A1 3/2008 Fridman et al.
2008/0063078 A1 3/2008 Futenma et al.
2008/0119274 A1 5/2008 Eck et al.
2009/0268090 A1 10/2009 Chung et al.
2010/0083192 A1* 4/2010 Zaman et al. ................. 715/866
2010/0271944 A1 10/2010 Michaelis et al.
2011/0014595 A1 1/2011 Birr
2011/0161871 A1* 6/2011 Stringer et al. ............... 715/800
2011/0252302 A1* 10/2011 Yalovsky ...................... 715/234
2011/0265029 A1 10/2011 Jeong
2012/0158406 A1 6/2012 Bells et al.

OTHER PUBLICATIONS

"ZoomText 9.1 Quick Reference Guide", Mar. 31, 2009, XP55003503, Retrieved from the Internet: URL:http://www.aisquared.com/docs/zt918/Z91_QRG_US_English.pdf [retrieved on Jul. 25, 2011].

Zoomtext 9.1 User's Guide, 2nd ed., Ai Squared, Manchester Center, Vermont, Feb. 2009.

International Search Report and Written Opinion for International Application No. PCT/US2011/034960, mailed Aug. 25, 2011.

* cited by examiner

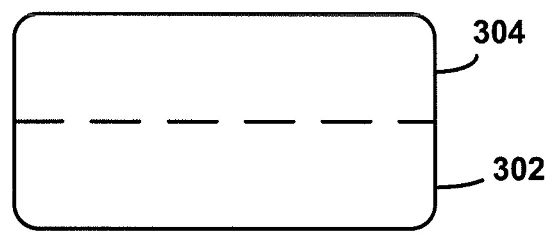
Figure 4A
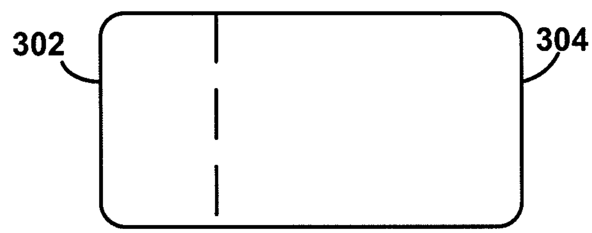
Figure 4B
304
302
Figure 4C
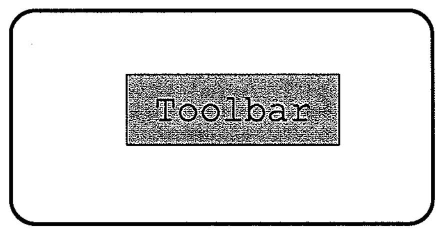
Figure 4D

DISPLAYING A USER INTERFACE IN A DEDICATED DISPLAY AREA

BACKGROUND

Many modern operating systems executing on a computer provide a virtual area, often called a "desktop," that serves as a user interface into which visual content such as images, icons, menus, or application user interfaces may be drawn or visually rendered. The desktop, including its drawn visual content, may then be displayed onto one or more display devices connected to the computer.

A typical computer desktop may be of limited use, however, to visually impaired users, who may not be able to adequately perceive content as it is typically displayed onto a display device. Accordingly, some users use Accessibility Technology (AT) software applications, such as ZoomText™ 9.1 Magnifier/Reader, developed by Ai Squared, Inc., of Manchester Center, Vt., that facilitate visually impaired users' use of computers. For example, such AT applications can apply enhancements, such as color enhancements, highlighting, magnification, or other enhancements, to a computer desktop to help a visually impaired user more easily perceive displayed content.

In one mode of operation, as illustrated by FIG. 1, an AT software application may magnify a portion (also referred to as a "viewport") of a computer desktop 101. In FIG. 1, the portion of the desktop inside viewport 103, rather than the full desktop area of desktop 101, is magnified and displayed on a display device 105. In the example of FIG. 1, although the viewport 103 is only a portion of the full area of desktop 101, it occupies the full display area of display device 105, thereby allowing for magnification of the content in the viewport.

The boundaries defining the viewport may be adjusted, thereby allowing a user to move a viewport to magnify or otherwise enhance a different portion of the desktop. The viewport may be moved, for example, when a user causes the mouse cursor to move to the edge of the current viewport boundary, which is taken as an indication that the user desires the viewport to be moved to display visual content beyond that edge boundary, and may be increased or decreased in size depending on the magnification level selected by the user.

SUMMARY

Some embodiments are directed to a method, performed in a computer that has at least one hardware processor and at least one tangible memory coupled to the at least one hardware processor, wherein the tangible memory stores computer instructions for an application program, wherein the at least one hardware processor is configured to execute the computer instructions for the application program, and wherein the computer is configured to display a computer desktop on a display device that has a display area and is coupled to the computer, of displaying a user interface for the application program on the display device. The method comprises: displaying a first portion of the computer desktop on the entirety of the display area of the display device; receiving an indication to display the user interface on the display device; in response to receiving the indication, partitioning the display area into a first display portion that is dedicated for displaying the user interface and a second display portion for displaying at least a portion of the computer desktop; displaying the user interface in the first display portion of the display area; and displaying at least some of the first portion of the computer desktop in the second display portion of the display area.

Some embodiments are directed to at least one computer readable storage medium, encoded with instructions that, when executed by a computer that is configured to display a computer desktop, perform a method of displaying a user interface for an application program on a display device that is coupled to the computer and has a display area. The method comprises: displaying a first portion of the computer desktop on the entirety of the display area of the display device; receiving an indication to display the user interface on the display device; in response to receiving the indication, partitioning the display area into a first display portion that is dedicated for displaying the user interface and a second display portion for displaying at least a portion of the computer desktop; displaying the user interface in the first display portion of the display area; and displaying at least some of the first portion of the computer desktop in the second display portion of the display area.

Some embodiments are directed to a computer configured to display a computer desktop on a display device that has a display area. The computer comprises: at least one tangible memory that stores computer instructions for an application program; and at least one hardware processor, coupled to the at least one tangible memory, that executes the computer instructions to: display a first portion of the computer desktop on the entirety of the display area of the display device; receive an indication to display the user interface on the display device; in response to receiving the indication, partition the display area into a first display portion that is dedicated for displaying the user interface and a second display portion for displaying at least a portion of the computer desktop; display the user interface in the first display portion of the display area; and display at least some of the first portion of the computer desktop in the second display portion of the display area.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4A is a diagram of a display that is partitioned into a first portion for displaying a toolbar/UI, and a second portion for displaying visual content from a desktop, wherein the first portion is positioned at the bottom of the display, in accordance with some embodiments;

FIG. 4B is a diagram of a display that is partitioned into a first portion for displaying a toolbar/UI, and a second portion for displaying visual content from a desktop, wherein the first portion is positioned at the left side of the display, in accordance with some embodiments;

FIG. 4C is a diagram of a display that is partitioned into a first portion for displaying a toolbar/UI, and a second portion for displaying visual content from a desktop, wherein the first portion is positioned at the right side of the display, in accordance with some embodiments;

FIG. 4D is a diagram of a display in which a toolbar/UI is overlaid on the desktop content, in accordance with some embodiments;

DETAILED DESCRIPTION

Some AT software applications, including the aforementioned ZoomText™ 9.1 Magnifier/Reader, provide a toolbar or other type of user interface (hereinafter, "toolbar/UI") by which a user may configure accessibility settings relating to the way that visual content to be displayed on a display device is enhanced. For example, such a toolbar/UI may provide controls via which a user may adjust the magnification level at which content is to be magnified, may adjust a magnification type to be used in displaying content, may select a predefined color scheme to be used or may define a custom color scheme, may adjust cursor or pointer enhancements, may adjust focus enhancements, and/or may control other configuration settings of the AT software application.

Figure 1:
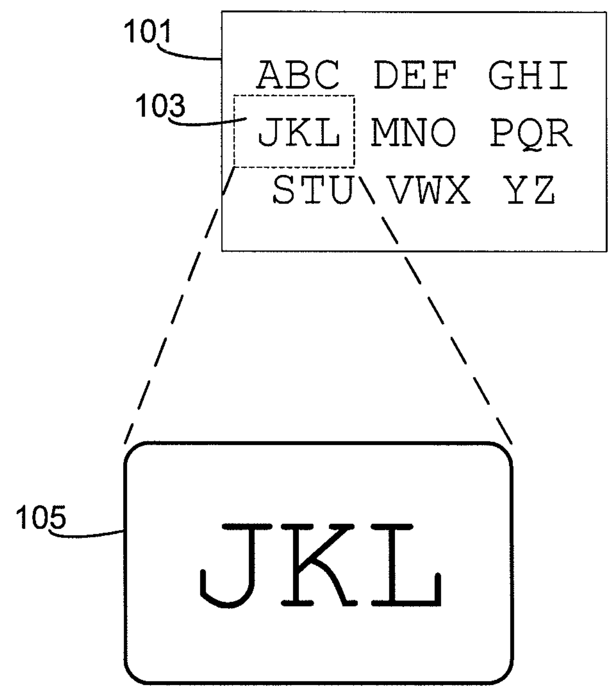
FIG. 1 is a diagram of a computer desktop, a portion of which is magnified and displayed on a display device.
Figure 2A:
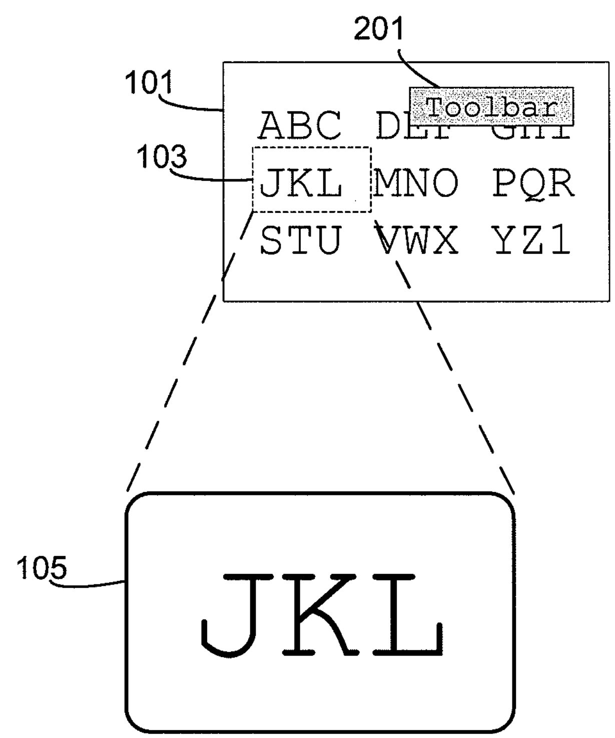
FIG. 2A is a diagram of a computer desktop that includes an accessibility technology (AT) software application toolbar/user interface (UI), wherein a portion of the desktop that does not include the toolbar/UI is magnified and displayed on a display device.

The inventors have recognized that when a portion of a computer desktop defined by a viewport is magnified by an accessibility technology (AT) software application, the toolbar/UI for adjusting the settings of the AT software application may be outside of the viewport. For example, as shown in FIG. 2A, desktop 101 includes a toolbar/UI 201 for configuring settings of the AT software application. However, because viewport 103 does not include the portion of desktop in which toolbar/UI 201 is located, toolbar/UI 201 is not displayed on display 105. Thus, the inventors have recognized that, in such situations, if a user wishes to adjust settings for the AT software application using toolbar/UI 201, the user may have to move the viewport to the location on the desktop at which toolbar/UI 201 is located. The inventors have further recognized that this may be inconvenient for the user because the user may have difficulty finding the location of the toolbar/UI on the desktop, particularly at high magnification levels where only a small portion of the desktop is displayed on the display at any given time. In addition, the inventors have appreciated that, when a user is working in an application program and wishes to access the toolbar/UI, the user may, after adjusting a setting in the toolbar/UI, wish to return to the location in the application program at which he or she was previously working. Thus, even after returning to the location on the desktop at which the toolbar/UI is located, the user may have difficulty locating the place in the application program at which he or she was previously working.

Figure 2B:
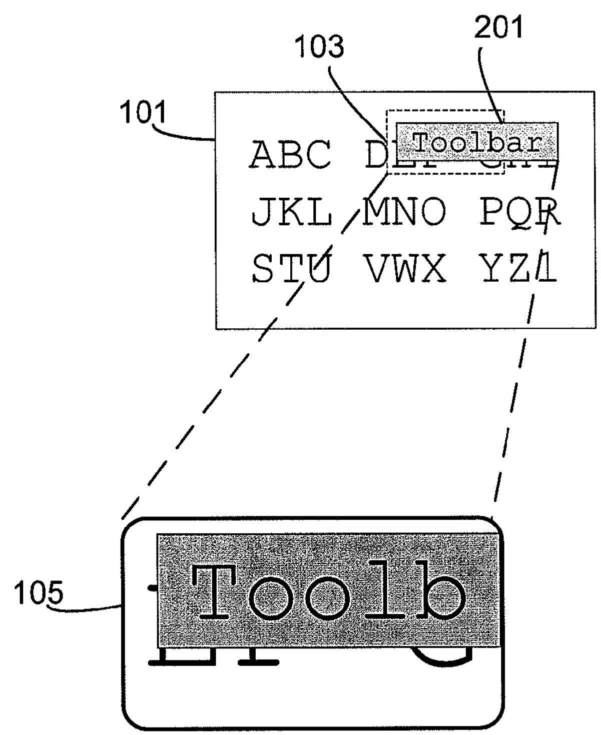
FIG. 2B is a diagram of a computer desktop that includes an accessibility technology (AT) software application toolbar/UI, wherein a portion of the desktop on which the toolbar/UI is overlaid is magnified and displayed on a display device.

Some AT software applications, including the aforementioned ZoomText™ 9.1 software application, provide a hotkey combination or other keyboard selection that, when input by a user, causes the viewport to be moved to the portion of the desktop at which the toolbar/UI is located and, if the toolbar/UI is underneath another application window, causes the toolbar to be displayed on top of the other application window. For example, in the ZoomText™ 9.1 software application, inputting, via the keyboard, a hotkey combination of CTRL+SHIFT+U, causes the viewport to automatically move to the location of the desktop of the ZoomText™ user interface and causes the user interface window to be displayed on top of any other windows. FIG. 2B shows desktop 101 and display 105 after a user has input such a hotkey combination. As shown in FIG. 2B, viewport 103 has been moved from its position on desktop 101 in FIG. 2A to the position at which toolbar/UI 201 is located. Thus, the portion of toolbar/UI 201 inside viewport 103 and the portion of desktop 101 inside viewport 103 that is not obscured by toolbar/UI 201 are displayed on display 105.

The inventors have recognized that, while such hotkey combinations facilitate locating the toolbar/UI on a magnified desktop, a user still may have difficulty returning to the portion of the desktop at which he or she was working prior to accessing the toolbar/UI. In addition, the inventors have recognized that, because the toolbar/UI is displayed in a window, the toolbar/UI window may be overlaid on other application program windows, thus obscuring the content of those windows or obscuring other desktop content. For example, as shown in FIG. 2B, toolbar/UI 201 obscures the text "EFG" on desktop 101, which may be, for example, text in a word processing application program. Thus, for example, if a user is working in an application program when the toolbar/UI is accessed (e.g., via a hotkey combination), the toolbar/UI may be displayed over the area in which the user was working.

Figure 2C:
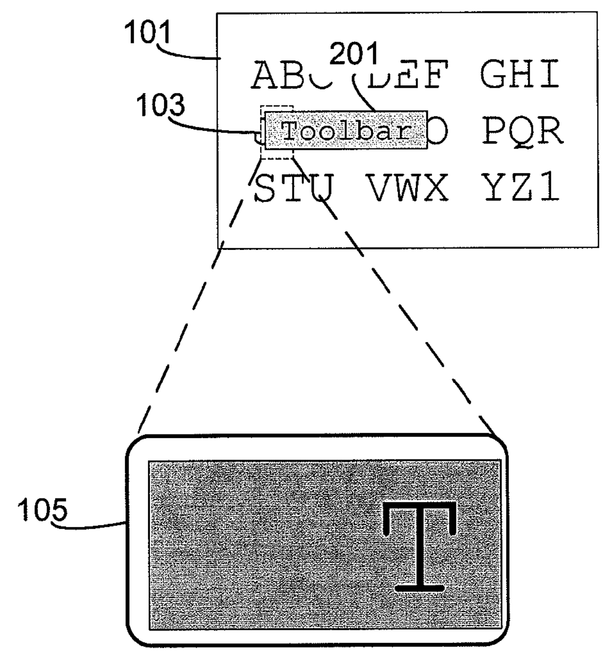
FIG. 2C is a diagram of a computer desktop that includes an accessibility technology (AT) software application toolbar/UI, wherein a portion of the desktop on which the toolbar/UI is overlaid is magnified at a greater magnification level than shown in FIG. 2B, and is displayed on a display device.

Moreover, prior art AT software applications magnify the toolbar/UI at the same level of magnification as all other magnified content on a computer desktop. That is, because the toolbar/UI is implemented in a window like other application programs, such AT software applications treat the toolbar/UI in the same manner as other visual content on the computer desktop. As such, the toolbar/UI is magnified in the same manner as other visual content. For example, if such a prior art AT software application is configured to magnify content at a 4× level, the toolbar/UI is also magnified at a 4× level. The inventors have recognized that, in magnified displays, the entire toolbar/UI may not fit within the boundaries of the viewport. This problem is exacerbated at high magnification levels, when only a small portion of the toolbar/UI may fit in the boundaries of the viewport. For example, as shown in FIG. 2C, only a small portion of toolbar/UI 201 fits within the boundaries of viewport 103. The inventors have recognized that this may present difficulties for the user in accessing the toolbar/UI because the portion of the toolbar/UI that the user wishes to access may be outside the boundaries of the viewport. Thus, the user may have to manually cause the viewport to be moved to the portion of the toolbar/UI that he or she wishes to access.

Thus, some embodiments address the above-discussed shortcomings of the prior art. However, while some embodiments may address each of these shortcomings, not every embodiment addresses all of these shortcomings. In particular, some embodiments may only address some of these shortcomings, and some embodiments may not address any of the above-discussed shortcomings of the prior art, as the invention is not limited to addressing all or any of the above-discussed shortcomings.

Some embodiments are directed to techniques for rendering an AT software application toolbar/UI in a separate portion of a display from the content of the computer desktop. That is, while the user interfaces for other application programs may be rendered on the computer desktop, the toolbar/UI for the AT software application may be rendered in a separate portion of the display from the portion of the display in which the computer desktop (or a portion thereof) is displayed.

In some embodiments, when a user is working in an environment that is magnified by an AT software application, the user may input a command to access the toolbar/UI. When such a command is received by the AT software application, rather than causing the viewport to be automatically moved to the desktop location of the toolbar/UI, the AT software application may partition the display into two portions, visually render the toolbar/UI in one portion of the display and cause all or a portion of the viewport content to be displayed in the other portion of the display. Thus, the toolbar/UI is not overlaid on the desktop content, but is rather displayed in a separate display area from the desktop content. When the toolbar/UI is displayed on a portion of the display, the area available to display desktop content within the viewport boundaries is reduced. Thus, the entirety of the desktop content that is within the viewport boundaries may not be able to be displayed in the area that is available to display this content. As such, in some embodiments, the size of the viewport may be reduced to make room on the display for the toolbar/UI, while maintaining or increasing the magnification level at which the desktop content is displayed.

Figure 3A:
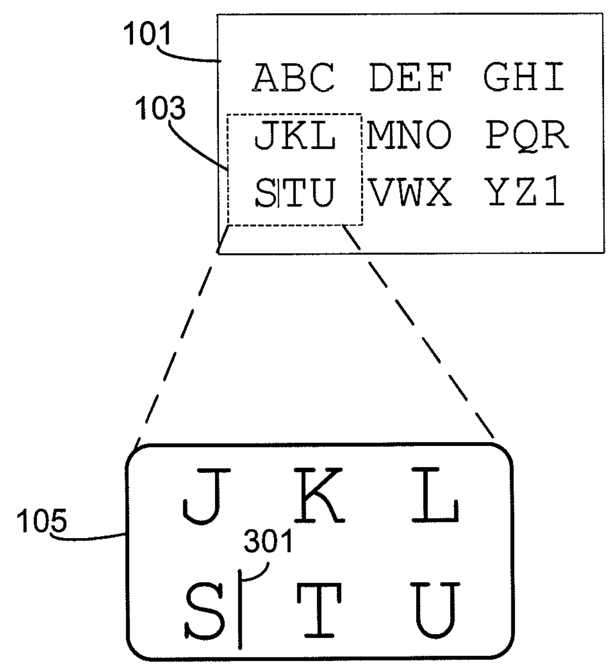
FIG. 3A is a diagram of a computer desktop, a portion of which is magnified and displayed on a display device, which may be partitioned to have a separate portion for displaying a toolbar/UI, in accordance with some embodiments.

For example, FIG. 3A shows a desktop 101 in which the portion of desktop 101 within the boundaries of viewport 103 is displayed on display device 105. The portion of desktop 101 that is displayed on display 105 includes the text "JKL" and "STU," with a cursor 301 following the letter "S." If a user inputs a command to access the toolbar/UI, the AT software application may cause the toolbar/UI to be rendered on display device 105. Because the toolbar/UI occupies some space on display device 105 and is not overlaid on the visual content on display device 103, the AT software application may reduce the size of viewport 103 so that there is room on the display to display the toolbar/UI.

The amount by which the size of viewport 103 is reduced may depend on the size and magnification level of the toolbar. That is, in some embodiments, when a user command to access the toolbar/UI is received, a first portion of the display may be reserved for rendering the toolbar/UI. The size of the first portion of the display may depend on the size and magnification level of the toolbar. The remainder of the display (i.e., the second portion of the display) may be used to display the content of the viewport 103. As such, when the toolbar is displayed, the area of the display available to display the content of viewport 103 is smaller. Thus, the size of viewport 103 may be reduced so that the content of viewport 103 fits in this smaller display area (i.e., the second portion of the display). The amount by which the size of viewport 103 is reduced may be, for example, an amount such that the content of the reduced-size viewport entirely fits in the second portion of the display. When an indication to remove the toolbar/UI from the display is received, the toolbar/UI may be removed from the display and the entirety of the visual content of viewport 103 may be displayed on the display.

Any suitable portion of the visual content of viewport 103 may be excluded from the reduced-size viewport to make room for the toolbar/UI on the display. In some embodiments, the portion of the visual content of the viewport that is excluded may be determined based on a user-configurable setting of the AT software application. FIGS. 3B-3E illustrate several possibilities, that may be used in some embodiments, for selecting a portion of the visual content of the viewport to be exclude from the reduced-size viewport to make room for rendering a toolbar/UI. It should be understood that these are only several examples of many possibilities, and that the various other techniques for selecting the portion of the visual content of a viewport to be kept in a reduced-size viewport may be employed.

Figure 3B:
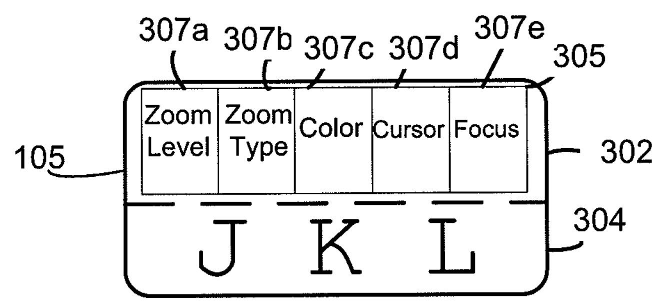
FIG. 3B is a diagram of display that is partitioned into a first portion for displaying a toolbar/UI, and a second portion for displaying visual content from a desktop, wherein the bottom portion of the visual content from the desktop is removed to make room for the first portion, in accordance with some embodiments.

FIG. 3B shows display 105, having a first portion 302 and a second portion 304. The dashed line in FIG. 3B (and FIGS. 3D, 3F, 3H, and 3I) is shown merely to illustrate that the display is divided into two portions, and does not form a part of the visual content that is rendered on display 105. Portion 302 of display 105 is used for rendering a toolbar/UI 305 that includes various controls 307*a*, 307*b*, 307*c*, 307*d*, and 307*e* for adjusting settings of the AT software application. The controls 307 may include any suitable graphical input component, including, for example, a button, a slider, an input text box, a pull down or other type of menu, and/or any other suitable type of control. In addition, while toolbar/UI 305 is shown in FIGS. 3B-3E to include five controls, the invention is not limited in this respect, as any suitable number of controls may be included, and these controls may adjust or configure any suitable aspect of the functionality of the AT software application.

Figure 3C:
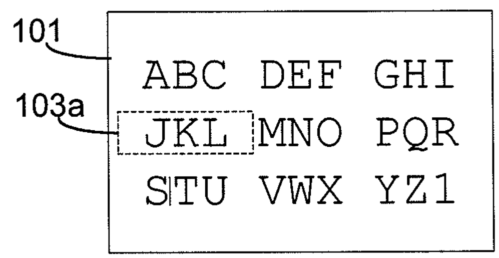
FIG. 3C is a diagram of the computer desktop of FIG. 3A, in which the size of the viewport has been reduced to remove the content that was previously in the bottom portion of the viewport, in accordance with some embodiments.

The remainder of display 105 (i.e., portion 304) is used to render the visual content of viewport 103, shown in FIG. 3A, after it has been reduced in size. In the example of FIG. 3B, the vertical height of viewport 103 has been reduced to exclude the content in the bottom portion of viewport 103 in order to fit the rest of the content of viewport 103 in portion 304 of display 105. FIG. 3C shows display 105 having a viewport 103*a*, which represents viewport 103 of FIG. 3A after it has been reduced in size to exclude the content in the bottom portion of viewport 103. For example, assuming that the content of viewport 103 is displayed at 4× magnification, if viewport 103 is 400 pixels high, and there is room to display 800 vertical pixels in portion 304 of display 105, then viewport may be reduced in height such that the bottom 200 pixels of the viewport 103 are excluded from viewport 103*a* in FIG. 3C. As such, only the top 200 vertical pixels of each row (which is 800 vertical pixels at 4× magnification) of viewport 103 remain in the reduced-size viewport 103*a*, and these pixels are displayed in portion 304 of display 105.

In this example, the portion at the bottom of viewport 103 that does not fit in portion 304 and that is excluded from viewport 103*a* is the portion that includes the text, "STU." Thus, as shown in FIG. 3B, this portion of the viewport is not displayed in portion 304 of display 105 and, as shown in FIG. 3C, the text "STU" is not included in reduced-size viewport 103*a*.

Figure 3D:
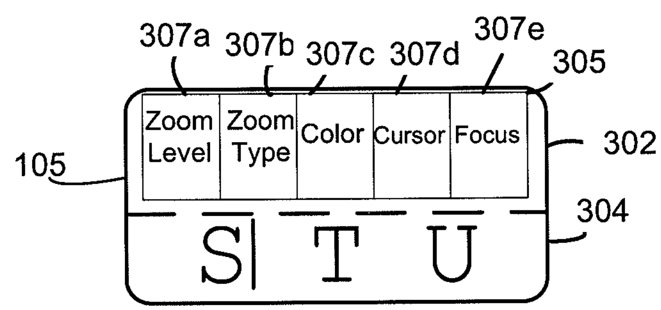
FIG. 3D is a diagram of a display that is partitioned into a first portion for displaying a toolbar/UI, and a second portion for displaying visual content from a desktop, wherein the top portion of the visual content from the desktop is removed to make room for the first portion, in accordance with some embodiments.
Figure 3E:
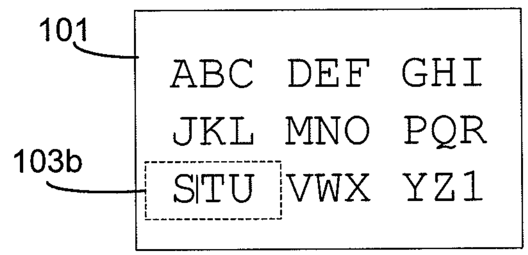
FIG. 3E is a diagram of the computer desktop of FIG. 3A, in which the size of the viewport has been reduced to remove the content that was previously in the top portion of the viewport, in accordance with some embodiments.

In the example of FIG. 3D, viewport 103 is reduced in height so that the top portion of viewport 103 is excluded from the reduced-size viewport. FIG. 3E shows a reduced-size viewport 103*b* which represents viewport 103 of FIG. 3A after it has been reduced in size in this manner. As shown in FIG. 3E, reduced-size viewport 103*b* includes the content in the bottom portion of viewport 103 of FIG. 3A. When the size of viewport 103 is reduced in this manner, the portion at the top of viewport 103 that does not fit in reduced-size viewport 103*b* is the portion that includes the text "JKL." As such, as shown in FIG. 3D, the text "STU," (i.e., the content of reduced-size viewport 103*b*) is displayed in portion 304 of display 105.

Figure 3F:
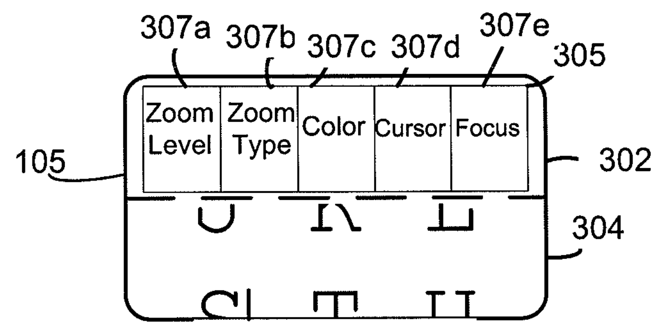
FIG. 3F is a diagram of a display that is partitioned into a first portion for displaying a toolbar/UI, and a second portion for displaying visual content from a desktop, wherein a portion of the top of the visual content and a portion of the bottom of the visual content are removed to make room for the first portion, in accordance with some embodiments.

In the example of FIG. 3F, the size of viewport 103 is reduced in height by excluding, in the reduced-size viewport, equal portions of the visual content of viewport 103 from the top and bottom, such that the middle section of the content of viewport 103 is included in the reduced-size viewport and displayed in portion 304.

Figure 3G:
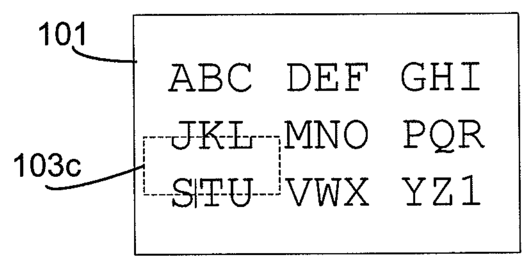
FIG. 3G is a diagram of the computer desktop of FIG. 3A, in which the size of the viewport has been reduced to remove some of the content that was previously in the top portion of the viewport and some of the content that was previously in the bottom portion of the viewport, in accordance with some embodiments.

FIG. 3G shows a reduced-size viewport 103*c* which represents viewport 103 of FIG. 3A after it has been reduced in size in this manner. As shown in FIG. 3G, viewport 103*c* includes a portion of the "JKL" and a portion of the text "STU." Thus, as shown in FIG. 3F, a portion of the text "JKL" and a portion of the text "STU' are displayed in portion 304 of display 105.

Figure 3H:
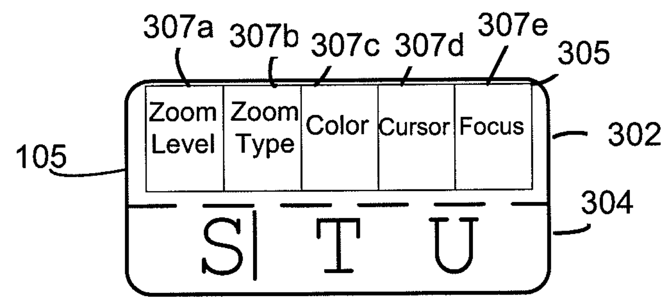
FIG. 3H is a diagram of a display that is partitioned into a first portion for displaying a toolbar/UI, and a second portion for displaying visual content from a desktop, wherein the portion of the computer desktop including a focus item has been kept in the reduced-size viewport, in accordance with some embodiments.

In the example of FIG. 3H, when the size of viewport 103 is reduced, the portion of the content of viewport 103 to be kept in the reduced-size viewport is selected based on the location of the user's focus, as indicated by a focus item. For example if, within viewport 103 there is a focus item (e.g., a text cursor), the portion of the content of viewport 103 that is included in the reduced-size viewport may be selected to include the focus item. As shown in FIG. 3A, cursor 301 is located after the text character "S." Thus, as shown in FIG. 3H, this portion of viewport 103 around cursor 301 may be kept in the reduced-size viewport. A number of techniques are possible for determining the size and position of the reduced-size viewport so that the focus item is included in the reduced-size viewport content. For example, the size and position of the reduced-size viewport may be selected such that the focus item (e.g., the text cursor) is kept in the center of the viewport. Alternatively, the size and position of the reduced-size viewport may be selected to minimize the amount of movement in the view (sometimes referred to as "edge tracking"). Yet another possibility is to adjust the size and position of the reduced-size viewport such that the focus item is close to the toolbar. Thus, for example, if there is room for three lines of text in the reduced-size viewport, and the toolbar/UI is displayed at the top of the display, the top line of text in the viewport would be the line that includes the focus item.

Another possible technique for selecting the portion the portion of the content of viewport 103 to be kept in the reduced-size viewport based on the user's focus, is to maintain information about the most recent event (i.e., prior to displaying the toolbar/UI) that caused the viewport to move. When deciding what content to include the reduced-size viewport, this information may be used to determine the area of intersection of the viewport and the last event location, and to keep this area (or at least a portion thereof) in the reduced-size viewport.

The examples above describe techniques for reducing the size of the desktop viewport to make room on the display for rendering a toolbar/UI, while maintaining or increasing the magnification level of the displayed content desktop. However, in some embodiments room on the display for rendering a toolbar/UI may be made by keeping the size of the viewport the same, but decreasing the magnification level at which the viewport content is displayed. In this manner, once the toolbar/UI is rendered on the display, the same desktop area continues to be displayed on the display, but a decreased magnification level and in a smaller portion of the display.

Figure 3I:
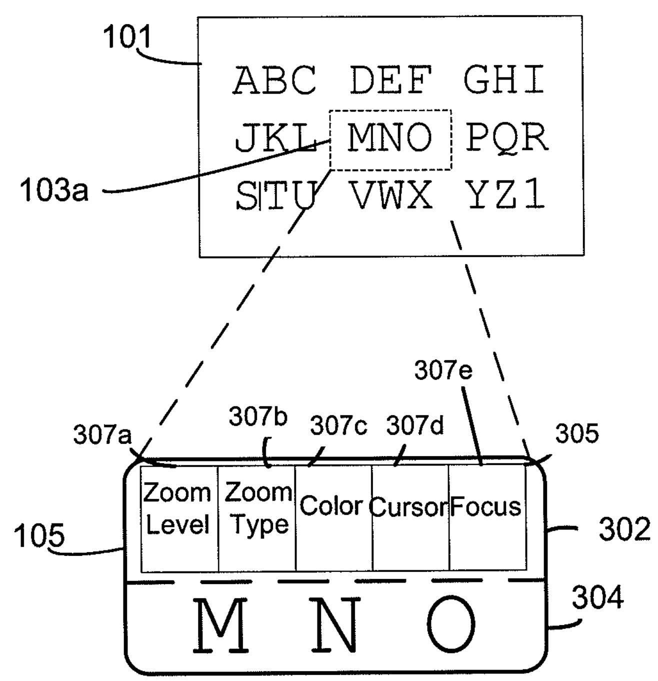
FIG. 3I is a diagram of computer desktop and a display that is partitioned into a first portion for displaying a toolbar/UI, and a second portion for displaying visual content from a desktop, wherein a viewport on the computer desktop is moved, changing the content that is displayed in the second portion of the display, in accordance with some embodiments.

If, after the indication to render the toolbar/UI is received, but before the indication to remove the toolbar/UI is received, the user adjusts the location of viewport 103, the content displayed in portion 304 may change to reflect the content of viewport 103 at its new location, while the toolbar remains displayed in portion 302. For example, as shown in FIG. 3I, if the location of viewport 103_a_ in FIG. 3C is moved to the right (i.e., relative to its location in FIG. 3C), such that it includes the text "MNO," the content that is displayed in portion 304 of desktop 105 changes to display text from the new location of the viewport.

In the examples of FIGS. 3A-3I, portion 302 (which is used for displaying the toolbar/UI) of display 105 is displayed at the top of the display, and portion 304 (which is used to display visual content of viewport 103) is at the bottom of the display. However, the invention is not limited in this respect, as portions 302 and 304 may be any suitable portions of the display device, and may be positioned relative to each other in any of a variety of ways. For example, in some embodiments, as shown in FIG. 4A, portion 302 may be the bottom portion of the display device and portion 304 may be the top portion. In some embodiments, as shown in FIG. 4B, portion 302 may be the left portion of the display device and portion 304 may be the right portion. In some embodiments, as shown in FIG. 4C, portion 302 may be the right portion of the display device and portion 304 may be the left portion. In some embodiments, the portion of the display that is used for displaying the toolbar/UI may be user-configurable setting. Thus, for example, a user of the AT software application may configure the AT software application to render the toolbar at the top, bottom, left, right, or any other suitable portion of the display, and the rest of the display may be used for displaying visual content in the viewport.

In addition, in some embodiments, rather than partitioning the display area and designating a separate portion of the partitioned display area for displaying the toolbar/UI, the toolbar/UI may be overlaid on the desktop content. For example, as shown in FIG. 4D, the toolbar/UI is overlaid on the area of the display that used to display desktop content. In such embodiments, the toolbar/UI may remain displayed until user input is received or some other event occurs that indicates that the toolbar/UI is to be removed. In situations in which the desktop content underneath the toolbar/UI is displayed at a magnification level greater than 1×, the desktop content may be scrolled underneath the toolbar/UI, such that a user may access the entire desktop, while the toolbar/UI remains displayed at the same location on the display.

Moreover, in the examples of FIGS. 3A-3I, the toolbar/UI is shown as having a rectangular shape. However, this shape is provided merely as an example, as the toolbar/UI may take any of a variety of shapes or geometries. For example, in some embodiments, the toolbar/UI may be elliptical. In some such embodiments, portion 302 of the display may be shaped elliptically, and portion 304 may be shaped to occupy the remainder of the display area outside the elliptically shaped portion 302.

It should be appreciated that the any number of a variety of possible controls may be provided in the toolbar/UI. For example, the controls in the toolbar/UI may control aspects of how the desktop content (e.g., the content displayed in portion 304) is displayed. That is, the controls in the toolbar/UI may be used to control a magnification level at which the desktop content is to be magnified, to adjust a magnification type to be used in displaying the desktop content, to select color enhancements to be applied to the desktop content, such as selecting a predefined color scheme or defining a custom color scheme to be applied to the desktop content, to adjust cursor or pointer enhancements, and/or to control a variety of other aspects relating to how the desktop content is displayed. In addition, the toolbar/UI may provide controls that relate to how the toolbar/UI is displayed (i.e., independently of enhancements applied to the displayed desktop content). For example, the toolbar/UI may provide a control to control the color enhancements of the toolbar/UI independent of the color enhancements that are applied to the desktop content.

The inventors have recognized that, in many situations, a visually impaired user may not need the same level of magnification for the toolbar/UI as for other content on the desktop. That is, the inventors have recognized that because a user may become familiar with the layout and functionality of the toolbar/UI after using it for a period of time, the user may not need to see the toolbar/UI as well in order to be able to access and use it effectively. In addition, icons in the toolbar/UI may be drawn using vector drawn images. Thus, when the toolbar/UI is magnified, the images for the icons may be redrawn by increasing the size of the vectors that make up the images using a scaling factor. This results in crisp icons, even at high levels of magnification. Because the icons are crisp, a visually impaired user may need less magnification in order to be able to see the icons in the toolbar/UI. Thus, in some embodiments, the magnification of the toolbar/UI may be adjusted independently of the magnification for the rest of the visual content that is displayed. This enables the user to, for example, specify a lower magnification level for the toolbar than the rest of the visual content on the desktop.

For example, a user with low vision may prefer 8× magnification (i.e., where content is displayed at 8 times its size for a given desktop size/resolution) for viewing most visual content displayed on the desktop, but may be able to effectively access and use a toolbar/UI that is magnified at 4× magnification. Thus, in some embodiments, the AT software application may provide the user with the capability (e.g., via the toolbar/UI) to independently adjust the magnification level of the toolbar/UI and the magnification level for the rest of the visual content on the desktop. As explained above in connection with the discussion of FIGS. 3A-3I, the size of portion 302 of display 105 that is used for displaying the UI/toolbar depends on the size and magnification level of the UI/toolbar. By reducing the magnification level of the UI/toolbar, its size is decreased and, as a result, portion 302 of display 105 is smaller. This leaves a greater portion of display 105 to be occupied by portion 304, which allows more of the visual content of viewport 103 to be kept in the reduced-size viewport and displayed in portion 304. Thus, by providing the user with the ability to independently adjust the magnification level of the toolbar/UI, when the magnification level of the toolbar/UI is decreased more display area becomes available for displaying desktop content, allowing the size of the reduced-size viewport to be increased, while still maintaining the user's preferred magnification level of the desktop content.

In the embodiments discussed above in connection with FIGS. 3A-3I, as the size of the toolbar/UI increases (e.g., as a result of increasing the magnification level), the size of portion 302 of display 105 is increased to accommodate the increased size of the toolbar/UI. As the size of portion 302 increases, the size of portion 304 decreases, and less of the visual content of viewport 103 may be kept in the reduced-size viewport and displayed in portion 304. The inventors have recognized that if the size of portion 302 becomes too large, the size of portion 304 may become so small that it is difficult for a user to effectively use. Thus, in some embodiments, the AT software application may limit the level of magnification of the toolbar/UI so that the toolbar/UI (and portion 302 of the display area) does not occupy more than a threshold percentage of the available display area on display 105. Any suitable threshold may be used, as the invention is not limited in this respect. For example, in some embodiments, the AT software application may limit the level of magnification of the toolbar/UI so that the toolbar/UI (and portion 302) does not occupy more than fifty percent of the display area on display 105.

Thus, for example, when a user inputs an increased magnification level for the toolbar/UI, the AT software application may determine the display area of the display device by multiplying the screen height of the display device by the screen width of the display device and may calculate the area of the toolbar/UI at the increased magnification level. The percentage of the display area that would be occupied by the toolbar/UI at the increased magnification level may be determined and compared with the threshold to evaluate whether displaying the toolbar/UI at the increased magnification level would exceed the threshold.

In embodiments in which the magnification level of the toolbar/UI is independent of the magnification level for the rest of the visual content, the AT software application may not permit the user to adjust the magnification level for the toolbar/UI beyond a level at which the toolbar/UI would occupy more than the threshold percentage of the display area. In embodiments in which the toolbar/UI does not have an independent magnification level, but is magnified at the same level as the rest of the visual content of the desktop, the AT software may permit the user to specify a magnification level that is beyond the level at which the toolbar/UI would occupy more than the threshold percentage, but when the magnification level is set to a level at which the toolbar/UI would occupy more than the threshold percentage of the display area, the AT software may not magnify the toolbar/UI at the specified level. That is, when the specified magnification level is a level at which the toolbar/UI would occupy more than the threshold percentage of the display area, the toolbar/UI may be magnified at the maximum level at which the toolbar/UI may be magnified without exceeding the threshold percentage of the display area, while the remainder of the visual content is magnified a the specified level.

Figure 5A:
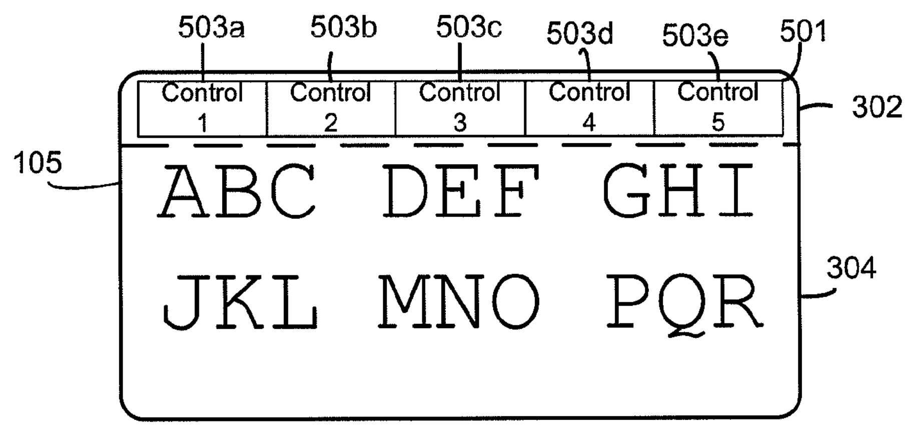
FIG. 5A is a diagram of a display that is partitioned into a first portion for displaying a toolbar/UI, and a second portion for displaying visual content from a desktop, wherein the size of the first portion of the display is determined based on the size and magnification level of the toolbar/UI, in accordance with some embodiments.
Figure 5B:
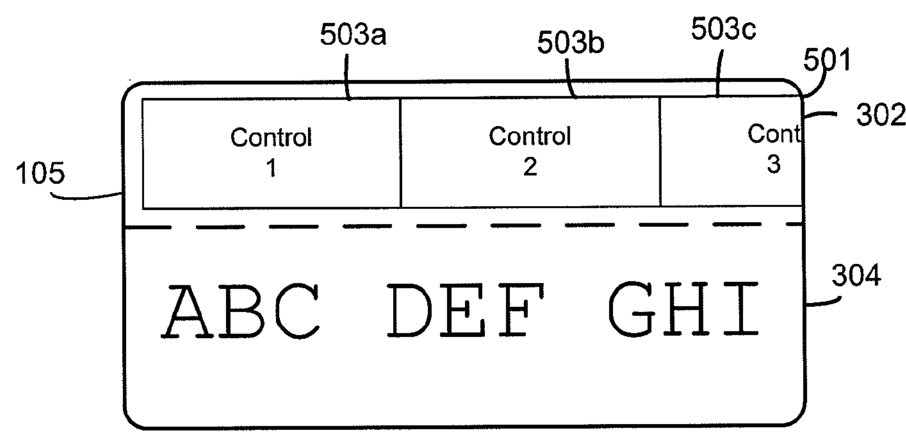
FIG. 5B is a diagram of a display that is partitioned into a first portion for displaying a toolbar/UI, and a second portion for displaying visual content from a desktop, wherein the size of the first portion of the display is increased in response to an increase in the size and/or magnification level of the toolbar/UI, in accordance with some embodiments.

The inventors have recognized that, in some situations, when the toolbar/UI is magnified, the entire toolbar/UI may not fit in portion 302 of display 105. That is, for example, when portion 302 is at the top of display 105, the height of portion 302 is adjusted to accommodate the magnified toolbar/UI. For example, as shown in FIG. 5A, toolbar/UI 501 may have five controls (503*a*-503*e*) and may be displayed at 2× magnification in portion 302 of display 105. FIG. 5B shows display 105 after magnification level of toolbar/UI 501 has been increased to 4× (i.e., without adjusting the magnification level of the remainder of the visual content on the desktop). As can be seen in FIG. 5B, the height of portion 302 of display 105 has been doubled (thereby decreasing the size of portion 304) to accommodate the increased height of toolbar/UI 501, but the width of portion 302 has not been increased because the width of portion 302 in FIG. 5A already occupies the entire width of display 105. As a result, at 4× magnification, the entire width of the toolbar/UI does not fit on display 105. As such, only controls 503*a* and 503*b*, and a portion of control 503*c* are displayed on display 105 and controls 503*d*, 503*e*, and a portion of control 503*c* are not displayed. As the magnification level of the toolbar/UI increases, an increasingly smaller portion of the width of toolbar/UI may be displayed on display 105.

Figure 5C:
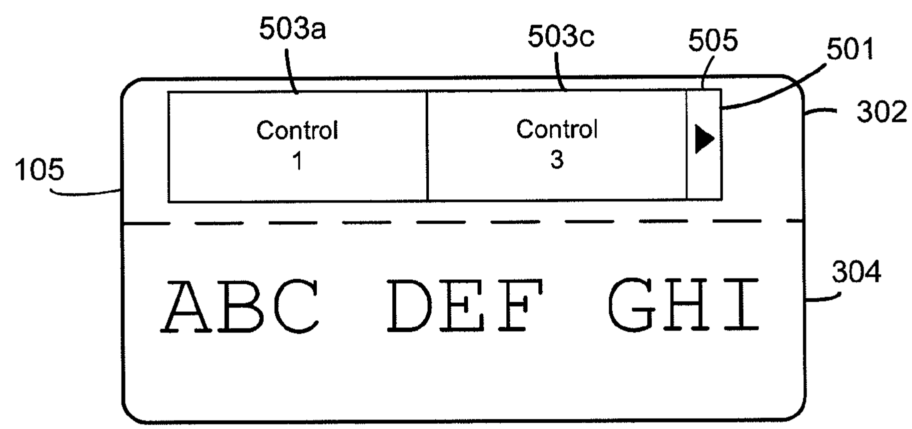
FIG. 5C is a diagram of a display that is partitioned into a first portion for displaying a toolbar/UI, and a second portion for displaying visual content from a desktop, wherein the toolbar/UI displayed in the first portion is reconfigured in response to an increase in the size and/or magnification level of the toolbar/UI, in accordance with some embodiments.
Figure 5D:
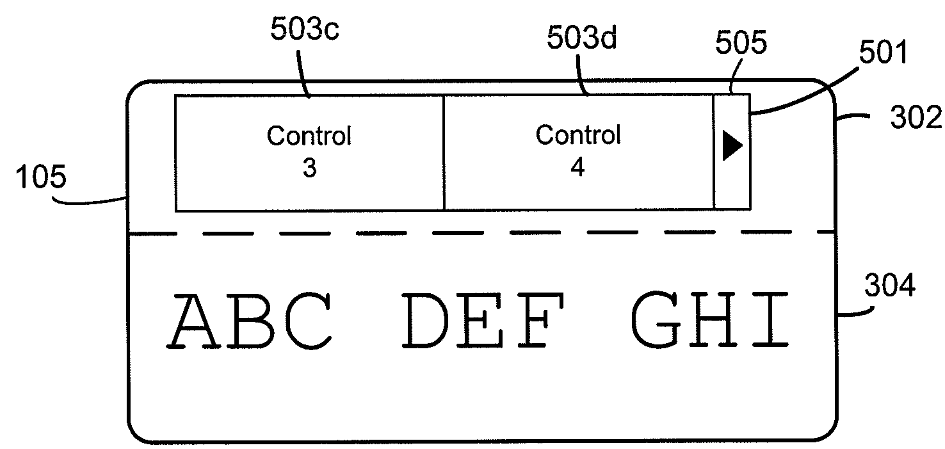
FIG. 5D is a diagram of a display that is partitioned into a first portion for displaying a toolbar/UI, and a second portion for displaying visual content from a desktop, wherein the toolbar/UI displayed in the first portion is reconfigured in response to an increase in the size and/or magnification level of the toolbar/UI and scrolled to display controls not originally shown in the reconfigured toolbar, in accordance with some embodiments.

The inventors have recognized that, when the magnification of the toolbar/UI is increased such that some portion of the toolbar does not fit in portion 302, it may be desirable to reconfigure the toolbar/UI such that the entire toolbar/UI fits in portion 302. As used herein, reconfiguring the toolbar refers to changing the number of controls or the layout of controls displayed on the toolbar/UI. For example, in some embodiments, the number of controls displayed on the toolbar may be reduced, such that the entire toolbar/UI fits in portion 302. As shown in FIG. 5C, because at 4× magnification, only two of the five controls of toolbar/UI 501 fully fit in portion 302, the toolbar/UI may be reconfigured such that only two of the five controls are displayed. A scroll control 505 may be added to the toolbar/UI that when selected, scrolls the controls 503 that are present in the toolbar/UI. This enables a user to access the controls that are not initially displayed in the reconfigured toolbar/UI. For example, FIG. 5D shows toolbar/UI 501 after scroll control 505 has been selected. As shown in FIG. 5D, control 503*a* has been scrolled off toolbar/UI 501 and control 503*d* has been scrolled on.

When a toolbar/UI is reconfigured to fit in portion 302 of display 105, the determination as to which controls to initially display on the reconfigured toolbar and which controls to remove may be made in any suitable way. In the example of FIG. 5C, controls 503*a* and 503*c* are kept and controls 503*b*, 503*d*, and 503*e* are removed (though they may be accessed using scroll control 505). In some embodiments, the determination as to which controls to keep and which controls to remove may be made based on which controls are most frequently used. Thus, for example, controls that are most frequently used may be kept on the reconfigured toolbar/UI and controls that are less frequently used may be removed.

Figure 6:
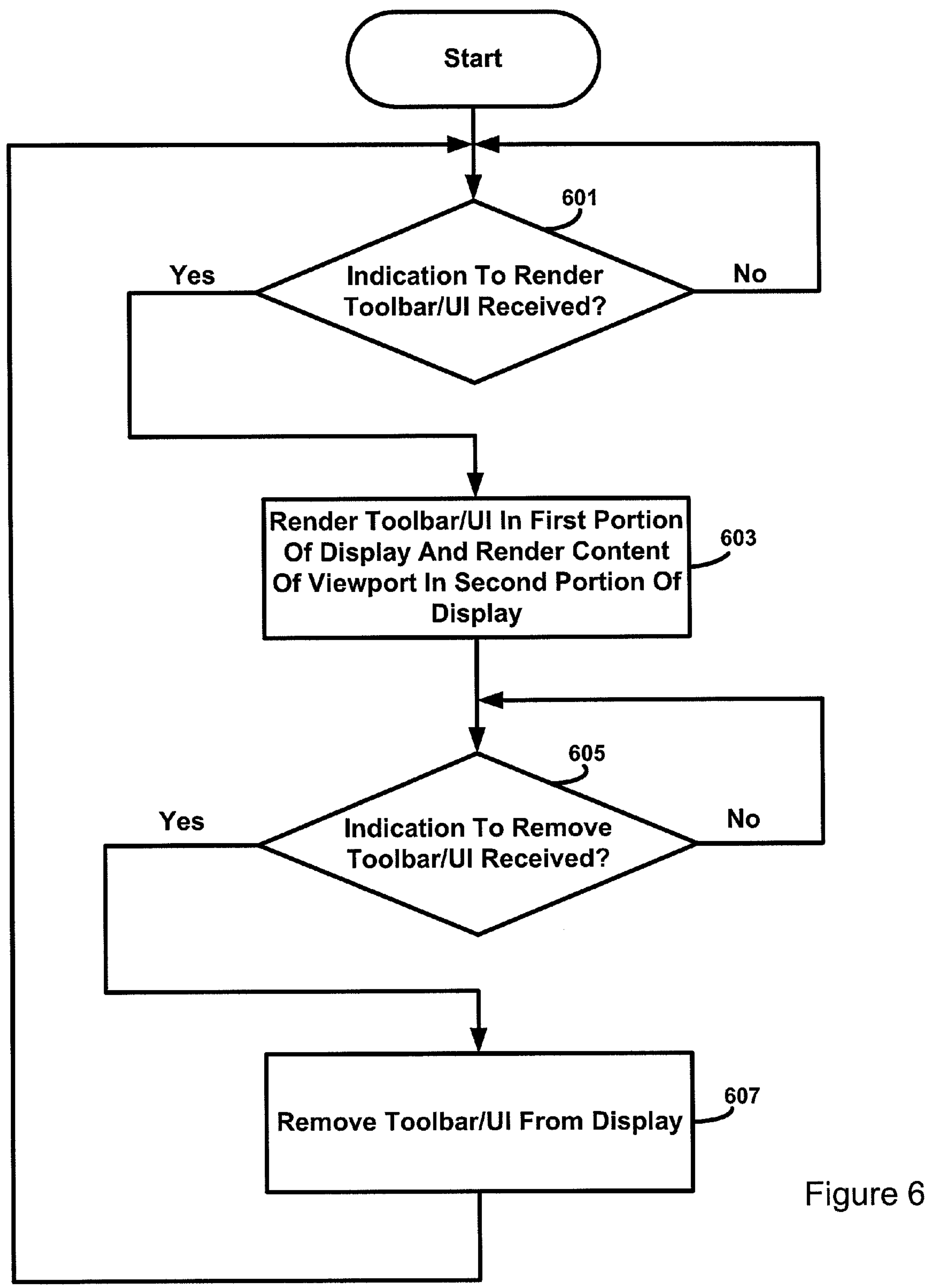
FIG. 6 is a flowchart of process that may be performed by an AT software application, in some embodiments, to render a toolbar/UI for the AT software application on a display.

FIG. 6 is a flowchart of process that may be performed by an AT software application, in some embodiments, to render a toolbar/UI for the AT software application on a display in the manner discussed above. The process begins at act 601, where the AT software application determines if an indication to render the toolbar/UI has been received. Any number of possible user actions may be treated as indication to render the toolbar/UI. For example, a user keyboard input of a particular hotkey combination (e.g., "CTRL+SHIFT+U"), selection of a particular desktop icon for the AT software application, selection of a menu item corresponding to the AT software application, and/or selection of taskbar icon corresponding to the AT software application may be considered indications to render the toolbar/UI.

If, at act 601, it is determined that no indication to render the toolbar/UI has been received, the process continues to wait for an indication to render the toolbar/UI. If, however, it is determined at act 601 that an indication to render the toolbar/UI has been received, the process continues to act 603, where the toolbar/UI is rendered in a first portion of the display area of the display device and viewport content from the desktop is rendered in a second portion of the display area (e.g., in the manner described above in connection with FIGS. 3A-3I). A variety of different techniques for displaying the toolbar/UI in a first portion of the display and viewport content from the desktop in a second portion of the display may be used, and various embodiments of the invention may use various techniques. Examples of some techniques for accomplishing this, which may be used in some embodiments, are discussed below in greater detail in connection with FIG. 7.

After act 603, the process continues to act 605, where the AT software application determines if an indication to remove the toolbar/UI has been received. Any number of possible user actions may be treated as indication to remove the toolbar/UI. For example, a user may explicitly indicate that he or she desires that the toolbar/UI be removed by selecting a "close" button or control on the toolbar/UI and/or inputting a particular keyboard key, key sequence, or hotkey combination. In some embodiment, other user actions may additionally be treated as an indication to remove the toolbar. For example, a user shifting focus from the toolbar back to an application program or other object in the desktop and/or a user accessing a certain a control in the toolbar/UI may be treated as an indication to remove the toolbar from the display.

If, at act 605, it is determined that no indication to remove the toolbar is received, the process continues to wait for an indication to remove the toolbar/UI. If, however, it is determined at act 605 that an indication to remove the toolbar/UI is received, the process continues to act 607, where the toolbar/UI is removed from the display and the visual content of the viewport is displayed on the entire display area. After act 607, the process returns to act 601.

Figure 7:
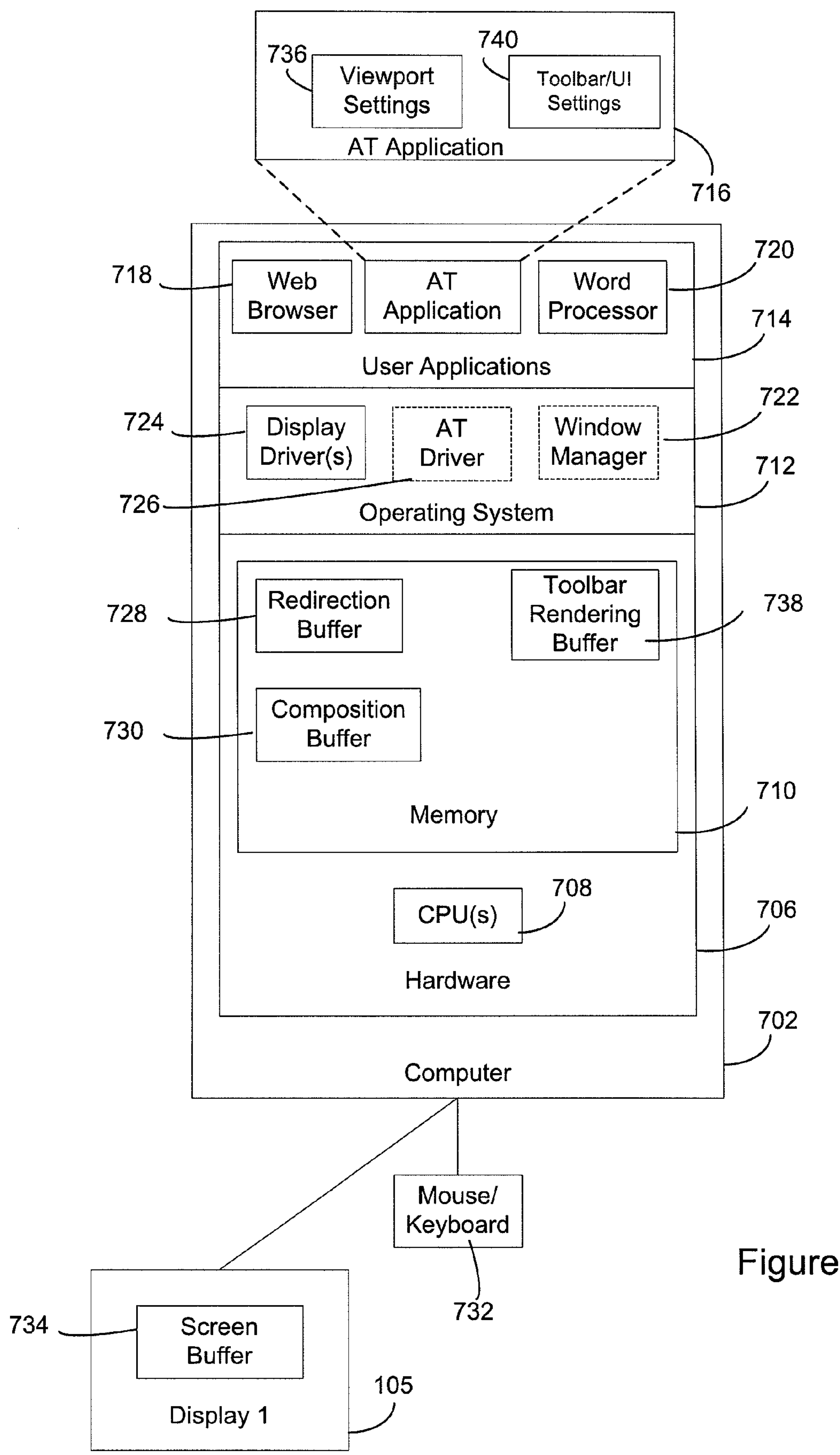
FIG. 7 is a diagram of computer system in which, in some embodiments, the process of FIG. 6 may be performed.

FIG. 7 is a block diagram of a computer 702, coupled to a display device 105, that may be configured to enhance a portion of visual content for display on display device 105. Computer 702 may be any suitable type of computer, such as, for example, a laptop personal computer, a desktop personal computer, a server computer, a smart-phone, a PDA, a thin client, or a "dumb terminal." Similarly, display device 105 may be any suitable display device, such as a computer monitor, a television, a projector, or any other type of display device or display screen.

Computer 702 may be implemented using any suitable combination of hardware and software. In the example of FIG. 7, computer 702 includes hardware 706, such as one or more CPU(s) 708 and computer memory 710. CPU(s) 708 may be of any suitable number and instruction architecture, including, for example, RISC, CISC, ARM, or Atom. Computer memory 710 may be any suitable type of tangible volatile or non-volatile data storage, including RAM, ROM, flash memory, hard disk, magnetic disk, optical disk, another type of tangible data storage medium, or any suitable combination thereof.

Computer 702 may also store software, such as operating system 712 and user applications 714 in memory 710. While the operating system 712 and the user applications 714 are illustrated as being separate from computer memory 710, they may be stored in any suitable executable form in computer memory 710, and may be stored in different types of memory depending on their current execution state.

Operating system 712 may execute on hardware 706, and may be any suitable operating system, such as a variant of Microsoft Windows™, Mac OS X, Linux, UNIX, operating systems intended for mobile or embedded devices, or any other suitable operating system. User Applications 714 may execute on hardware 706 through interfaces provided by operating system 712. Applications 714 may include an Accessibility Technologies (AT) software application 716, and/or any suitable other types of user applications, such as, for example, web browser 718 and word processor 720. Of course, the embodiments described herein do not require that other applications, such as a web browser and word processor, be present.

Included in operating system 712 may be a window manager 722, which may manage the composition and rendering of windows on a computer desktop. Window manager 722 may be implemented in any suitable way and may execute in either kernel or user space. Operating system 712 may also include one or more display driver(s) 724 corresponding to the display device 105. Computer 702 may also include an AT driver 726, which may operate in connection with the AT application to provide enhancements in a viewport displayed on the display device. While AT driver 726 is illustrated as a component of operating system 712, in some embodiments, AT driver726 may be installed separately from the operating system and may be a part of AT software application 726, but may execute in kernel address space with other operating system components. Window manager 722 and AT driver 726 are illustrated as having dashed borders to signify that they may not be included in some embodiments, depending on the specific technique of performing viewport enhancements.

FIG. 7 illustrates several buffers, including redirection buffer 728, composition buffer 730, and toolbar rendering buffer 738 that have been allocated from computer memory 710. While these are illustrated as being separate memory buffers, some embodiments may use a single buffer in the place of redirection buffer 728 and composition buffer 730. Redirection buffer 728 and composition buffer 730 may be accessible from either or both of kernel address space and a user address space. They may also be accessible from components of operating system 712, a user application(e.g., AT application 716), or any combination thereof. As discussed in greater detail below, buffers 728, 730, 738 may be used in displaying enhanced visual content from the desktop and the toolbar/UI on display 105.

Connected to the computer 702 may also be one or more input device(s) 732, which may be any suitable input device, such as a mouse, keyboard, stylus, microphone, pointing device, or touch screen, or any suitable combination thereof. Input device(s) 732 may be integrated in the same enclosure as computer 702 or may be external to but otherwise coupled to computer 702 (e.g., via a wired or wireless connection).

Display device 105 may also include a memory buffer internal to the display device, illustrated in FIG. 7 as screen buffer 734. The screen buffer (also sometimes referred to as a "frame buffer") may be accessible (e.g., through memory mapping) to components in operating system 712 or to a user application, such as AT application 716. The contents stored in screen buffer 734 may correspond to the actual contents displayed on display device 105.

As discussed above, computer 702 may be configured to enhance a viewport of the computer desktop, such as by performing magnification of the visual content in the viewport, and to display the enhanced viewport on display device 105. Accordingly, AT application 716 may store viewport settings 736 (e.g., in memory 710). The viewport settings 736 may include, for example, current viewport coordinates that define the current viewport boundary, current magnification level of the viewport, and other viewport enhancement settings. AT application 716 may also store (e.g., in memory 710) toolbar/UI settings 740, which may include, configuration settings particular to the display of the toolbar/UI, including for example a magnification level for the toolbar/UI, the location on the display at which to render the toolbar/UI (e.g., top, bottom, left, or right), and/or any other suitable settings.

When AT software, such as AT software application 716 and/or AT driver 726 is not being used to display visual content or display a toolbar/UI on display 105, an application, such as one of user applications 714, desiring to display visual content on display device 105 may typically do so using an interface provided by operating system 712. Upon receiving the instruction through the interface to display visual content, depending on the specific operating system configuration, the operating system 712 may in some configurations copy the visual content directly to screen buffer 734, thereby displaying the content on the display device 105. In other operating system configurations, upon receiving the instruction through the interface, the operating system 712 may first write the visual content in a buffer, sometimes known as a "back buffer." A component, such as window manager 722, of operating system 712, may perform transformations on the visual content in the back buffer, such as applying translucent or transparent effects, and then copy the data from the back buffer to screen buffer 734, which allows display device 105 to display the visual content.

According to some embodiments, when AT software is configured to enhance a portion of visual content before displaying that enhanced visual content on display device 105, the portion of the visual content may first be enhanced by the AT software before the operating system copies the content to the back buffer or screen buffer 734. In some embodiments, upon receiving through the interface the instruction to display visual content from one of user applications 714, the operating system 712 be caused to copy the visual content to redirection buffer 728 rather than to the back buffer or to screen buffer 734.

In some embodiments, the AT software may then copy the portion of the visual content that is configured to be enhanced from redirection buffer 728 to composition buffer 730 and enhance the content, such as, for example, through magnification, although the AT software need not apply any enhancement to the visual content. The enhancement may be performed before the content is copied from the redirection buffer to the composition buffer, after the content is copied from the redirection buffer to the composition buffer, or the copying and enhancement may be performed simultaneously or near simultaneously. Alternatively, the visual content may be enhanced while it is in redirection buffer 728 and copied to composition buffer 730 after the enhancements have been applied, or the copying and enhancements may be performed simultaneously. Visual content from redirection buffer 728 may be copied to composition buffer 730 and enhanced at periodic intervals or as the result of a notification that visual content in redirection buffer 728 has changed. Moreover, it should be appreciated that some embodiments may not use a separate redirection buffer and composition buffer. For example, in some embodiments, the visual content may be enhanced directly in redirection buffer 728. The actual enhancement processing may be carried out in any suitable way, including by any suitable combination of hardware or software. In some embodiments, the enhancement may be performed by AT driver 726 and/or AT application 716. The enhancement may alternatively or additionally be performed in dedicated hardware, such as in a graphics processing unit in hardware 706. Such dedicated graphics processing hardware may be accessible to computer 702 in any suitable way. For example, the dedicated hardware may be integrated on a system board of computer 702 (e.g., "motherboard") or it may be on a separate circuit board such as a graphics adapter card that is electrically coupled to the system board.

Regardless of the specific manner in which the enhancement processing is performed, the AT software may instruct operating system 712 to copy the enhanced visual content in composition buffer 730 to screen buffer 734 for display onto display device 105. This may be done in any suitable way. For example, in some embodiments, the AT software may issue a function call to display driver 724 to have it copy the visual content from composition buffer 730 to screen buffer 734. In other embodiments, composition buffer 730 may actually be the "back buffer," discussed above. In such embodiments, the AT software may issue an instruction through an interface with a component of operating system 712, such as window manager 722 or a DirectX component, to inform the operating system that the visual content is to be displayed on display device 105. In some embodiments, window manager 722 may then optionally apply transformations (e.g., transparency effects, etc.) to the visual content in composition buffer 730 (which may also be the back buffer). After any optional transformations have been performed, window manager 722 may then copy the contents of composition buffer 730 to screen buffer 734 to allow the visual content to be displayed on display device 734. While in the discussion above, the AT software is described as performing enhancements on the visual content prior to any optional transformations being applied by window manager 722, it should be appreciated that window manager 722 may apply transformations to the visual content in composition buffer 730 either before or after the AT software enhances the content in the composition buffer 730. For example, enhancements performed by the window manager may be performed on the content that is written into the redirection buffer, prior to that content being copied to the composition buffer.

After any enhancements and optional transformations have been performed, window manager 722 may then copy the contents of composition buffer 730 to screen buffer 734 to allow the visual content to be displayed on display device 734.

When the AT software receives an indication to render the toolbar/UI (e.g., at act 601 of FIG. 6), AT software may render the toolbar/UI image into toolbar rendering buffer 738 at the magnification level specified in toolbar/UI settings 740. If the appearance of the toolbar is to change (e.g., in response to a user adjusting the toolbar/UI magnification level or position, or in response to AT software reconfiguring the toolbar), the AT software may detect that such a change is to occur and re-draw the toolbar/UI image into toolbar rendering buffer 738.

In some embodiments, when the toolbar/UI is to be displayed on display 105, rather than causing content to be displayed by copying the visual content from redirection buffer 728 to composition buffer 730, applying enhancements (e.g., magnification, color scheme enhancements, cursor enhancements, and/or other types of enhancements) to the content in composition buffer 730, and then copying the composition buffer 730 to screen buffer 734, content from both redirection buffer 728 and toolbar rendering buffer 738 may be copied to composition buffer 730 before copying composition buffer 730 to screen buffer 734. That is, in some embodiments, when the toolbar/UI is to be rendered on the display, the AT software may determine how much of the display area of display 105 the rendered toolbar/UI image would occupy and determines where on the display (e.g., top, bottom, left, or right), the toolbar/UI is to be positioned. The AT software may render the toolbar/UI image in toolbar rendering buffer 738, as discussed above.

Based on the size and position of the toolbar/UI, the AT software may determine the portion of the display area of display device 105 that is to be occupied by the toolbar/UI. As discussed above, the portion of the display area that is to be occupied by the toolbar/UI is shown as portion 302 in FIGS. 3C-3F. The AT software may determine the portion of composition buffer 730 that corresponds to the determined portion of the display area, and toolbar rendering buffer 738 may then be copied into this portion of composition buffer 730. The AT software may then determine how much of the display area is left unoccupied by the toolbar/UI. This remaining portion of the display area is shown as portion 304 in FIGS. 3C-3F.

The AT software may determine how much of the visual content of the current viewport may be displayed in the remaining display area, and may then access the visual content corresponding to the current viewport from redirection buffer 728, adjust the size of the viewport and/or the magnification level so that the desired desktop content fits in the remaining display area on the display, and copy the remaining visual content into the portion composition buffer 730 that corresponds to the remaining display area. The AT software may apply any user-specified enhancements to the portion of the visual content that is copied into composition buffer 730, though it is not necessary that any enhancements be applied, as the visual content of the desktop may be displayed in portion 304 of the display without any enhancements. Composition buffer 730 may then be copied to screen buffer 734, causing the contents of composition buffer 730, which includes both the toolbar/UI and the desktop visual content, to be displayed on display 105.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, a game console, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In embodiments in which the computer is a game console, the input device may be a game pad or other game controller.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. In a computer that has at least one hardware processor and at least one tangible memory coupled to the at least one hardware processor, wherein the tangible memory stores computer instructions for an application program, wherein the at least one hardware processor is configured to execute the computer instructions for the application program, and wherein the computer is configured to display a computer desktop on a display device that has a display area and is coupled to the computer, a method of displaying a user interface for the application program on the display device, the method comprising:

displaying a viewport of the computer desktop on the display area of the display device while the display area is unpartitioned;

receiving an indication to display the user interface on the display device;

in response to receiving the indication:

partitioning the display area into a first display portion that is dedicated for displaying the user interface and a second display portion for displaying the viewport of the computer desktop;

displaying at least a portion of the user interface in the first display portion of the display area;

reducing the viewport in size to create a reduced-size viewport of the computer desktop that fits in the second display portion of the display area; and displaying the reduced-size viewport of the computer desktop in the second display portion of the display area, such that the user interface is not overlaid on the reduced-size viewport of the computer desktop;

providing in the user interface a plurality of controls, at least some of which are configured to control at least one aspect of the appearance of the reduced-size viewport of the computer desktop displayed in the second display portion of the display area; and in response to an instruction to set a magnification level of the computer desktop displayed in the second display portion of the display area:

if matching a magnification level of the user interface to the magnification level of the computer desktop would not cause the first display portion to occupy more than a threshold amount of the display area, then sizing the first display portion to accommodate the user interface matched to the magnification level of the computer desktop; and if matching the magnification level of the user interface to the magnification level of the computer desktop would cause the first display portion to occupy more than the threshold amount of the display area, then limiting the first display portion to the threshold amount of the display area by not matching the magnification level of the user interface to the magnification level of the computer desktop.

2. The method of claim 1, wherein the viewport of the computer desktop displayed while the display area is unpartitioned comprises the entire computer desktop.

3. The method of claim 1, wherein the viewport of the computer desktop displayed while the display area is unpartitioned comprises a subsection of the computer desktop that is magnified by the application program so that it occupies the unpartitioned display area.

4. The method of claim 1, wherein providing the plurality of controls comprises:

providing a first control in the user interface via which a user may adjust a magnification level at which the computer desktop is to be displayed; and providing a second control in the user interface via which a user may adjust a magnification level at which the user interface is to be displayed independently of the magnification level at which the computer desktop is displayed.

5. The method of claim 4, wherein the second control defines a maximum magnification level at which the user interface is to be displayed, and wherein the maximum magnification level is a magnification level at which the user interface occupies a threshold percentage of the display area.

6. The method of claim 4, further comprising:

in response to user input via the second control that specifies an increased magnification level at which the user interface is to be displayed, determining whether displaying the user interface at the increased magnification level would cause the displayed user interface to extend outside the display area; and when it is determined that displaying the user interface at the increased magnification level would cause the displayed user interface to extend outside of the display area, reconfiguring the user interface to fit in the display area.

7. The method of claim 6, wherein reconfiguring the user interface to fit in the display area comprises displaying less than all of the plurality of controls in the first display portion of the display area.

8. The method of claim 1, further comprising:

in response to user input, adjusting the reduced-size viewport of the computer desktop displayed in the second display portion of the display area to change which portion of the computer desktop is displayed in the reduced-size viewport.

9. The method of claim 1, wherein the plurality of controls comprises at least one control that controls a magnification level of the reduced-size viewport of the computer desktop displayed in the second display portion of the display area.

10. The method of claim 1, wherein the plurality of controls comprises at least one control that controls color enhancements applied to the reduced-size viewport of the computer desktop displayed in the second display portion of the display area.

11. The method of claim 1, wherein providing the plurality of controls comprises:

providing a first control in the user interface via which a user may adjust color enhancements to be applied to the displayed computer desktop; and providing a second control in the user interface via which a user may adjust color enhancements to be applied to the user interface independently of the color enhancements to be applied to the computer desktop.

12. The method of claim 1, further comprising:

continuing to display the at least a portion of the user interface in the first display portion of the display area during user input directed to the reduced-size viewport of the computer desktop in the second display portion of the display area.

13. At least one non-transitory computer readable storage medium encoded with instructions that, when executed by a computer that is configured to display a computer desktop, perform a method of displaying a user interface for an application program on a display device that is coupled to the computer and has a display area, the method comprising:

displaying a viewport of the computer desktop on the display area of the display device while the display area is unpartitioned;

receiving an indication to display the user interface on the display device;

in response to receiving the indication:

partitioning the display area into a first display portion that is dedicated for displaying the user interface and a second display portion for displaying the viewport of the computer desktop;

displaying at least a portion of the user interface in the first display portion of the display area;

reducing the viewport in size to create a reduced-size viewport of the computer desktop that fits in the second display portion of the display area; and displaying the reduced-size viewport of the computer desktop in the second display portion of the display area, such that the user interface is not overlaid on the reduced-size viewport of the computer desktop;

providing in the user interface a plurality of controls, at least some of which are configured to control at least one aspect of the appearance of the reduced-size viewport of the computer desktop displayed in the second display portion of the display area; and in response to an instruction to set a magnification level of the computer desktop displayed in the second display portion of the display area:

if matching a magnification level of the user interface to the magnification level of the computer desktop would not cause the first display portion to occupy more than a threshold amount of the display area, then sizing the first display portion to accommodate the user interface matched to the magnification level of the computer desktop; and if matching the magnification level of the user interface to the magnification level of the computer desktop would cause the first display portion to occupy more than the threshold amount of the display area, then limiting the first display portion to the threshold amount of the display area by not matching the magnification level of the user interface to the magnification level of the computer desktop.

14. The at least one non-transitory computer readable storage medium of claim 13, wherein the viewport of the computer desktop displayed while the display area is unpartitioned comprises the entire computer desktop.

15. The at least one non-transitory computer readable storage medium of claim 13, wherein the viewport of the computer desktop displayed while the display area is unpartitioned comprises a subsection of the computer desktop that is magnified by the application program so that it occupies the unpartitioned display area.

16. The at least one non-transitory computer readable storage medium of claim 13, wherein providing the plurality of controls comprises:

providing a first control in the user interface via which a user may adjust a magnification level at which the computer desktop is to be displayed; and providing a second control in the user interface via which a user may adjust a magnification level at which the user interface is to be displayed independently of the magnification level at which the computer desktop is displayed.

17. The at least one non-transitory computer readable storage medium of claim 16, wherein the second control defines a maximum magnification level at which the user interface is to be displayed, and wherein the maximum magnification level is a magnification level at which the user interface occupies a threshold percentage of the display area.

18. The at least one non-transitory computer readable storage medium of claim 16, wherein the method further comprises:

in response to user input via the second control that specifies an increased magnification level at which the user interface is to be displayed, determining whether displaying the user interface at the increased magnification level would cause the displayed user interface to extend outside the display area; and when it is determined that displaying the user interface at the increased magnification level would cause the displayed user interface to extend outside of the display area, reconfiguring the user interface to fit in the display area.

19. The at least one non-transitory computer readable storage medium of claim 18, wherein reconfiguring the user interface to fit in the display area comprises displaying less than all of the plurality of controls in the first display portion of the display area.

20. The at least one non-transitory computer readable storage medium of claim 13, wherein the method further comprises:

in response to user input, adjusting the reduced-size viewport of the computer desktop displayed in the second display portion of the display area to change which portion of the computer desktop is displayed in the reduced-size viewport.

21. The at least one non-transitory computer readable storage medium of claim 13, wherein the plurality of controls comprises at least one control that controls a magnification level of the reduced-size viewport of the computer desktop displayed in the second display portion of the display area.

22. The at least one non-transitory computer readable storage medium of claim 13, wherein the plurality of controls comprises at least one control that controls color enhancements applied to reduced-size viewport of the computer desktop displayed in the second display portion of the display area.

23. The at least one non-transitory computer readable storage medium of claim 13, wherein providing the plurality of controls comprises:

providing a first control in the user interface via which a user may adjust color enhancements to be applied to the displayed computer desktop; and providing a second control in the user interface via which a user may adjust color enhancements to be applied to the user interface independently of the color enhancements to be applied to the computer desktop.

24. The at least one non-transitory computer readable storage medium of claim 13, wherein the method further comprises:

continuing to display the at least a portion of the user interface in the first display portion of the display area during user input directed to the reduced-size viewport of the computer desktop in the second display portion of the display area.

25. A computer configured to display a computer desktop on a display device that has a display area, the computer comprising:

at least one tangible memory that stores computer instructions for an application program; and at least one hardware processor, coupled to the at least one tangible memory, that executes the computer instructions to:

display a viewport of the computer desktop on the display area of the display device while the display area is unpartitioned;

receive an indication to display the user interface on the display device;

in response to receiving the indication:

partition the display area into a first display portion that is dedicated for displaying the user interface and a second display portion for displaying the viewport of the computer desktop;

display at least a portion of the user interface in the first display portion of the display area;

reduce the viewport in size to create a reduced-size viewport of the computer desktop that fits in the second display portion of the display area; and display the reduced-size viewport of the computer desktop in the second display portion of the display area, such that the user interface is not overlaid on the reduced-size viewport of the computer desktop;

provide in the user interface a plurality of controls, at least some of which are configured to control at least one aspect of the appearance of the reduced-size viewport of the computer desktop displayed in the second display portion of the display area; and in response to an instruction to set a magnification level of the computer desktop displayed in the second display portion of the display area:

if matching a magnification level of the user interface to the magnification level of the computer desktop would not cause the first display portion to occupy more than a threshold amount of the display area, then sizing the first display portion to accommodate the user interface matched to the magnification level of the computer desktop; and if matching the magnification level of the user interface to the magnification level of the computer desktop would cause the first display portion to occupy more than the threshold amount of the display area, then limiting the first display portion to the threshold amount of the display area by not matching the magnification level of the user interface to the magnification level of the computer desktop.

26. The computer of claim 25, wherein the viewport of the computer desktop displayed while the display area is unpartitioned comprises the entire computer desktop.

27. The computer of claim 25, wherein the viewport of the computer desktop displayed while the display area is unpartitioned comprises a subsection of the computer desktop that is magnified by the application program so that it occupies the unpartitioned display area.

28. The computer of claim 25, wherein the at least one hardware processor executes the computer instructions to:

provide a first control in the user interface via which a user may adjust a magnification level at which the computer desktop is to be displayed; and provide a second control in the user interface via which a user may adjust a magnification level at which the user interface is to be displayed independently of the magnification level at which the computer desktop is displayed.

29. The computer of claim 28, wherein the second control defines a maximum magnification level at which the user interface is to be displayed, and wherein the maximum magnification level is a magnification level at which the user interface occupies a threshold percentage of the display area.

30. The computer of claim 28, wherein the at least one hardware processor executes the computer instructions to:

in response to user input via the second control that specifies an increased magnification level at which the user interface is to be displayed, determine whether displaying the user interface at the increased magnification level would cause the displayed user interface to extend outside the display area; and when it is determined that displaying the user interface at the increased magnification level would cause the displayed user interface to extend outside of the display area, reconfigure the user interface to fit in the display area.

31. The computer of claim 30, wherein reconfiguring the user interface to fit in the display area comprises displaying less than all of the plurality of controls in the first display portion of the display area.

32. The computer of claim 25, wherein the at least one hardware processor executes the computer instructions to:

in response to user input, adjust the reduced-size viewport of the computer desktop displayed in the second display portion of the display area to change which portion of the computer desktop is displayed in the reduced-size viewport.

33. The computer of claim 25, wherein the plurality of controls comprises at least one control that controls a magnification level of the reduced-size viewport of the computer desktop displayed in the second display portion of the display area.

34. The computer of claim 25, wherein the plurality of controls comprises at least one control that controls color enhancements applied to the reduced-size viewport of the computer desktop displayed in the second display portion of the display area.

35. The computer of claim 25, wherein the at least one hardware processor executes the computer instructions to:

provide a first control in the user interface via which a user may adjust color enhancements to be applied to the displayed computer desktop; and provide a second control in the user interface via which a user may adjust color enhancements to be applied to the user interface independently of the color enhancements to be applied to the computer desktop.

36. The computer of claim 25, wherein the at least one hardware processor executes the computer instructions to:

continue to display the at least a portion of the user interface in the first display portion of the display area during user input directed to the reduced-size viewport of the computer desktop in the second display portion of the display area.

* * * * *